(12) United States Patent
Gosh et al.

(10) Patent No.: US 7,671,161 B2
(45) Date of Patent: Mar. 2, 2010

(54) PROCESS FOR PRODUCING CONTROLLED VISCOSITY FLUOROSILICONE POLYMERS

(75) Inventors: Nancy E. Gosh, East Greenbush, NY (US); John S. Razzano, Albany, NY (US); Anping Wang, Clifton Park, NY (US)

(73) Assignee: Momentive Performance Materials Inc., Albany, NY (US)

( * ) Notice: Subject to any disclaimer, the term of this patent is extended or adjusted under 35 U.S.C. 154(b) by 473 days.

(21) Appl. No.: 11/549,137

(22) Filed: Oct. 13, 2006

(65) Prior Publication Data

US 2008/0090987 A1   Apr. 17, 2008

(51) Int. Cl.
*C08G 77/24* (2006.01)
(52) U.S. Cl. .............. 528/42; 528/34; 528/37
(58) Field of Classification Search .............. None
See application file for complete search history.

(56) References Cited

U.S. PATENT DOCUMENTS

| | | | |
|---|---|---|---|
| 3,481,898 A * | 12/1969 | Kendrick et al. | 528/14 |
| 4,287,353 A | 9/1981 | Bluetwein | |
| 4,683,277 A | 7/1987 | Maxson | |
| 4,985,525 A * | 1/1991 | Clark et al. | 528/15 |
| 5,374,702 A * | 12/1994 | Inomata et al. | 528/14 |
| 5,635,579 A * | 6/1997 | Evans et al. | 528/37 |

\* cited by examiner

*Primary Examiner*—Marc S Zimmer
(74) *Attorney, Agent, or Firm*—Dominick G. Vicari

(57) ABSTRACT

A process for making a fluorosilicone $$MD_a D^F_b M'$$

where
$M = R^1 R^2 R^3 SiO_{1/2}$;
$M' = (OH) R^6 R^7 SiO_{1/2}$ or $(OH) R^4 R^5 SiO_{1/2}$;
$D = R^4 R^5 SiO_{2/2}$; and
$D^F = R^6 R^7 SiO_{2/2}$;

where the subscript a is zero or positive, the subscript b is positive and the subscripts a and b satisfy the following relationship: $b > 0.4(a+b)$ and $R^1$ is selected from the group of 1 to 20 carbon atom monovalent alkyl, aryl, or alkaryl hydrocarbon radicals and terminally unsaturated alkenyl groups of from 2 to 10 carbon atoms; $R^2$, $R^3$ are each independently any monovalent hydrocarbon radical: alkyl, aryl, or alkaryl of from 1 to 20 carbon atoms or $R^1$ and each $R^4$ and $R^5$ are any monovalent hydrocarbon radical: alkyl, aryl, alkenyl, or alkaryl of from 1 to 20 carbon atoms, and $R^6$ is a fluorine substituted 3 to 20 carbon atom monovalent hydrocarbon radical having no fluorine substitution on the alpha or beta carbon atoms of the radical and $R^7$ is any monovalent hydrocarbon radical: alkyl, aryl, or alkaryl of from 1 to 20 carbon atoms or $R^6$ by reacting 1) b moles of $(R^6 R^7 SiO)_3$, with 2) a moles of $(R^4 R^5 SiO)_3$,
3) $R^1 R^2 R^3 SiOH$ and
4) an oxygenated promoter. Compositions made by the process and articles of manufacture made from the compositions.

15 Claims, No Drawings

PROCESS FOR PRODUCING CONTROLLED VISCOSITY FLUOROSILICONE POLYMERS

FIELD OF INVENTION

The present invention relates to the preparation of siloxane polymers comprising tri-fluoropropyl groups or other fluoroalkyl or perfluoralkyl groups having a high level of substitution in the siloxane polymer or copolymer and therefore a higher level of fluorine content.

BACKGROUND

Siloxane polymers and copolymers containing the trifluoropropyl group are the most common commercially available fluorosilicone polymers. Typical fluorosilicone copolymers have the general formula:

$$MD_aD^F{}_bM$$

with
  $M=R^1R^2R^3SiO_{1/2}$;
  $D=R^4R^5SiO_{2/2}$; and
  $D^F=R^6(CH_2CH_2CF_3)SiO_{2/2}$;

where the subscripts a and b are non-zero and positive and satisfy the following relationship: b is less than or equal to 0.4(a+b) and $R^1$, $R^2$, $R^3$, $R^4$, $R^5$, and $R^6$ maybe any monovalent hydrocarbon radical: alkyl, aryl, or alkaryl but are typically methyl ($CH_3$), and in some cases can be typically vinyl. Equilibrium considerations imposes a practical upper limit of 40 mole percent on the number of D units substituted with the trifluoropropyl subsitutent. The following polymer:

$$MD^F{}_bM$$

cannot be prepared by equilibration reactions when b is large because, at equilibrium, cyclic silicones are the thermodynamically favored species and therefore the yield of polymer is low. Thus, when b>0.4(a+b), polymer yields are low. Because fluorosilicones possess desirable properties such as solvent resistance, higher mole percent substitution of the silicone polymer chain with trifluoropropyl substituents and polymers (and copolymers) where b is large is desirable.

Preparing liquid injection moldable fluorosilicone polymers from addition curable precursors requires either a hydride fluorosilicone, a vinyl endstopped fluorosilicone or both as addition curable components. Preparing low viscosity liquid materials that cure to a conformal coating or encapsulant from additional curable precursors also requires a hydride and a vinyl endstopped fluorosilicone as an addition curable component. A synthetically convenient route to obtaining addition curable fluorosilicone polymers has been to use the classical approach to the problem of obtaining a vinyl endstopped fluorosilicone by first making a silanol endstopped fluorosilicone by polymerizing the so-called fluoro trimer, e.g.

$$((CH_3)(CH_2CH_2CF_3)SiO)_3$$

using a mild non-equilibrating catalyst such as $NH_4OH$ with water as the chainstopper at high pressure, or temperatures in the range of 100-135° C. at atmospheric pressure conditions employing NaOH as a catalyst or employing KOH as a catalyst at temperatures of 50-100° C. In siloxanes polymerizations, KOH is a stronger polymerization catalyst that NaOH and will initiate polymerizations at lower temperatures than NaOH. But, even at temperatures as low as 50° C., KOH may catalyze undesirable condensation reactions of silanol terminated polymers and/or causing equilibration to occur, resulting poor viscosity control and reduced polymer yields. Typically, the silanol terminated polymers so formed are reacted with divinyltetramethyldisilazane to produce a vinyl terminated fluorosilcone polymer. It is known that other materials that can convert a silanol into an alkenyldialkyl siloxy endgroup are also acceptable for treating such silanol stopped polymers. Such material would include various alkenyldialkylamino silanes, and the like. However, such materials are much higher in cost than divinyltetramethyldisilazane, which is commercially available. This approach to synthesizing a vinyl stopped fluorosilicone suffers from the drawback that the trimer polymerization reaction with water or diols is not controllable in terms of the viscosity (or molecular weight) of the resulting silanol stopped fluorosilicone. Reaction with divinyltetramethyldisilazane only converts the molecules to the desired vinyl stopped fluorosilicone polymers adding nothing by way of molecular weight or viscosity control to the product. Viscosity control is very important for commercial products. A lack of viscosity control can cause a variety of problems. Polymer viscosity can control both physical and application properties. For example, if polymer viscosity is poorly controlled, multiple batches must be produced and blended to target viscosities. This results in excess inventories and disruption of production schedules. Further, polymer blending must be within certain ranges. Blending batches over wider viscosity ranges will change final product properties. Achieving excellent viscosity control over such polymers permits efficient production and consistent quality.

High viscosity flurosilicone rubber compounds are made by first producing a high viscosity fluorosilicone polymer, typically in a doughmixer because of the high viscosity of such polymers. The polymers are removed from the polymerizing doughmixer and transferred to a second mixing machine, often another doughmixer, where other ingredients, such as fumed silica are added. When high viscosity fluorosilicone polymers are made, they have been made by polymerizing fluorosilicone trimer at 120-130° C. with NaOH. These conditions are non-equilibrating and result in 99-100% conversion of the cyclic trimer to polymer. Thus, suitable polymer is already in the mixer for directly making the fluorosilicone rubber compounds by adding filler and other ingredients. However, after the fluorosilicone rubber compound is removed from the mixer, there will always be small amounts of such compounds left in the mixer. When it is attempted to make a second batch of fluorosilicone polymer following the production of a fluorosilicone rubber compound, the silica filler in the residual compound reacts with the NaOH at the polymerization conditions, deactivating the catalyst. This can be overcome by using large amounts of NaOH, but such larger amounts of NaOH will result in undesirable properties of the final rubber product, which is often used in extreme applications.

The equilibration polymerization of dimethylsilicones and their copolymers, from, for example, the cyclic tetramer, cyclic pentamer, or hydrolyzate, will typically produce a product with 85% polymer and 15% cyclics at equilibrium, and these polymerizations, especially to produce high molecular weight polymers used in silicone rubber are done at temperatures above 140° C. using KOH as the equilibration catalyst. Such polymers are thereafter compounded with silica fillers, especially fumed silica, and often in "doughmixers" to produce silicone rubber. The technology to do polymerization and compounding in a single step in the same mixer has never been effective because the presence of 15% cyclics at the end of polymerization would require a long and expensive stripping step, this is further complicated by the fact that at temperatures above 140° C., the KOH reacts with the silica to produce potassium silicate destroying the catalyst.

BRIEF SUMMARY

The present invention provides for a process for making a fluorosilicone having the formula: $MD_aD^F_bM'$, where $M=R^1R^2R^3SiO_{1/2}$; $M'=(OH)R^6R^7SiO_{1/2}$ or $(OH)R^4R^5SiO_{1/2}$; $D=R^4R^5SiO_{2/2}$; and $D^F=R^6R^7SiO_{2/2}$; where the subscript a is zero or positive, the subscript b is positive and the subscripts a and b satisfy the following relationship: $b>0.4(a+b)$ and $R^1$ is selected from the group of 1 to 20 carbon atom monovalent alkyl, aryl, or alkaryl hydrocarbon radicals and terminally unsaturated alkenyl groups of from 2 to 10 carbon atoms; $R^2$, $R^3$ are each independently any monovalent hydrocarbon radical: alkyl, aryl, or alkaryl of from 1 to 20 carbon atoms or $R^1$ and each $R^4$ and $R^5$ are any monovalent hydrocarbon radical: alkyl, aryl, alkenyl, or alkaryl of from 1 to 20 carbon atoms, and $R^6$ is a fluorine substituted 3 to 20 carbon atom monovalent hydrocarbon radical having no fluorine substitution on the alpha or beta carbon atoms of the radical and $R^7$ is any monovalent hydrocarbon radical: alkyl, aryl, or alkaryl of from 1 to 20 carbon atoms or $R^6$ by reacting:

1) b moles of $(R^6R^7SiO)_3$ with
2) a moles of $(R^4R^5SiO)_3$,
3) $R^1R^2R^3SiOH$;
4) an oxygenated promoter and 5)
5) a basic catalyst. More particularly the present invention provides for a process wherein $D^F$ is present in $MD_aD^F_bM'$ in an amount greater than 40 mole percent.

The present invention provides for fluorosilicone compositions made by the process of the present invention and for articles of manufacture made from the compositions made by the process of the present invention. The invention also provides for cured fluorosilicone polymers comprising the reaction products of compositions made by the process of the present invention.

DETAILED DESCRIPTION OF THE INVENTION

The present invention relates to siloxane polymers comprising tri-fluoropropyl or other fluoroalkyl groups, wherein such polymers possess vinyl groups on the chain stopping termini of the molecules, processes producing such polymers in a range of viscosities, and processes that simplify the production of high viscosity fluorosilicone rubber. Medium viscosity (40000 to 200000 cps) vinyl terminated high fluorine content siloxanes provide precursors to high fluorine content addition cured siloxane polymers that are pumpable and are easy to mold. Low viscosity vinyl terminated high fluoro content fluorosilicone polymers (300-10000) are useful in producing solvent resistant conformal coatings. The production of very high viscosity (5000000 to 200000000 cps) fluorosilicone polymers by a simplified process to allow for lower cost production of high consistency fluorosilicone rubber.

We have found that the use of an alkenyldialkylsilanol in combination with a reaction promoter allows the non-equilibrium reaction of cyclic trimeric siloxanes containing fluorine substituents at low polymerization temperatures to produce fluorine containing polymers where the level of substitution of perfluoroalkylsiloxanes is above 40 mole percent in high yields with excellent viscosity control. We have also found that it is possible to polymerize cyclic trimeric siloxanes containing fluorine substituents at low temperatures by using water as the chainstopper and achieve good viscosity control by the use of a reaction promoter.

When silanol containing species are used as chainstoppers, the lower the polymerization temperature the less the undesired silanol condensation side reaction occurs. The less condensation that occurs, the better control of molecular weight and therefore the better the viscosity control. Alkenyldialkylsilanols generally provide better viscosity control than silicone diols (terminally di-substituted silanol endstopped low molecular weight siloxanes) or water because when such monomeric silanols polymerize into the polymer, one end of the polymer contains the alkenyldialkylsiloxy group and the other end of the polymer contains a silanol group. When a silicone diol or water is used as the chainstopper, silanol groups on both ends of the polymer result. Thus the silanol content, at any polymer viscosity, is sometimes twice as high when silicone diols or water are used as chainstoppers compared to when a alkenyldialkylsilanol is used as a chainstopper. Consequently there is less condensation possible when the alkenyldialkylsilanol is used as a chainstopper. However, it is possible to substitute water for the chainstopper resulting in a polymer having the following formula:

$$M''D_aD^F_bM'$$

with $M''=(OH)R^6R^7SiO_{1/2}$ or $(OH)R^4R^5SiO_{1/2}$ (chosen independently of M');

$M'=(OH)R^6R^7SiO_{1/2}$ or $(OH)R^4R^5SiO_{1/2}$ (chosen independently of M'');

$D=R^4R^5SiO_{2/2}$; and $D^F=R^6R^7SiO_{2/2}$;

The silanol stopped fluoro-silicone oligomers, polymers or copolymers produced by the process of the present invention may be reacted with vinyl silazanes to produce vinyl terminated fluoro-silicone polymers, i.e. curable fluorosilicone polymers. The resulting vinyl terminated fluoro-silicone polymers may be cross-linked by hydrosilylation with hydrido-siloxanes or hydrido-fluoro-siloxanes to produce cured fluoro-silicone polymers or co-polymers. Alternatively, the silanol stopped fluoro-silicone oligomers, polymers or copolymers produced by the process of the present invention may be reacted with other silanol stopped silicones under condensation cure conditions, using condensation cure catalysts.

The discovery of the use of promoters, in conjunction with a polymerization catalyst such as NaOH, allows much lower temperatures of polymerization even down to room temperature, a temperature below which the cyclic fluorosilicone trimer will solidify. This allows much better viscosity control. This is an especially useful result for fluorosilicone polymers since the viscosity is very sensitive to total chainstopper content. The lower temperatures of reaction allowed by the use of oxygenated promoters means that basic catalysts such as the alkali metal hydroxides may be used to accomplish the process of the present invention.

In one embodiment of the present invention the process of the present invention is conducted at a temperature ranging from about 20° C. to about 70° C. In another embodiment of the present invention the process of the present invention is conducted at a temperature ranging from about 20° C. to about 80° C. In still another embodiment of the present invention the process of the present invention is conducted at a temperature ranging from about 20° C. to about 90° C. With more active alkali metal hydroxide catalysts, it may be desirable to initiate the reaction at lower temperatures so that any resulting reaction exotherm does not cause the reaction mixture to exceed a temperature of 95° C.

Embodiments of the invention comprising the use of a promoter with a non-equilibrating catalyst along with an agent that provides for silanol, disilanol, alkenyl, and tri-alkyl chainstopping at low temperatures allows for the production of polymers with good viscosity control. Silanol groups are converted to trialkyl endgroups or alkenyldialkyl endgroups when treated with selected silazanes or silyl amines or combinations of such. The use of trialkylsilanols, such as the use of trialkylsilanols, such as trimethylsilanol with a promoter, and NaOH as a catalyst, at 40° C., produces a trialkylsiloxy and silanol terminated polymer of controlled molecular weight and controlled viscosity. The use of water, in conjunction with the above ingredients and conditions will also provide a polymer with trialkyl termination on both ends after the initial silanol stopped polymer is treated with a silazane material such as hexamethyldisilazane.

The silanol stopped polymers produced by the process of the invention may be reacted with silazane compounds to produce tri-alkyl stopped polymers or to produce alkenyl stopped polymers that may be cross-linked by hydrosilylation with hydride cross-linkers. The hydride cross-linkers may also be fluorosilicone polymers or copolymers depending on the desired product. Generally almost any linear silazane will be suitable for such a conversion with disilazanes such as 1,1,3,3-tetramethyl-1,3-diphenyldisilazane (tetramethyldiphenyldisilazane), 1,1,3,3-tetramethyldisilazane (tetramethyldisilazane), hexamethyldisilazane, and 1,3-divinyl-1,1,3,3-tetramethyldisilazane (divinyltetramethyldisilazane) being especially useful.

The silanol stopped polymers produced by the process of the invention may be reacted with aminosilane compounds, liberating a conjugate amine and extending the polymeric siloxane chain by one silicon atom for each silanol reacted. Generally almost any aminosilane will be suitable for such a reaction with aminosilanes such as trimethylisopropylaminosilane, dimethylvinylisopropylsilane, dimethylaminosilane, and trimethylmethylaminosilane, and the like being especially useful.

Further, the present invention allows for a new process for producing fluorosilicone rubber compounds, from either high viscosity or liquid silicone rubber. This process is especially suitable for producing high viscosity fluorosilicone rubber compounds. The use of a promoter allows NaOH to be an active non-equilibrating catalyst at temperatures where the NaOH will not react with residual silica. Thus fluorosilicone polymers can be made at high yield and low catalyst levels in a doughmixer and can be followed by immediate compounding to a fluorosilicone rubber compound without being removed from the mixer. This polymerization/compounding can be done repeatedly resulting in a lower costs process for making fluorosilicone rubber compounds.

Thus the process of the present invention provides for the preparation of compounds having the formula:

$$MD_aD^F_bM'$$

with $M=R^1R^2R^3SiO_{1/2}$;
$M'=(OH)R^6R^7SiO_{1/2}$ or $(OH)R^4R^5SiO_{1/2}$;
$D=R^4R^5SiO_{2/2}$; and
$D^F=R^6R^7SiO_{2/2}$;

where the subscript a is zero or positive, the subscript b is positive and the subscripts a and b satisfy the following relationship: $b>0.4(a+b)$ and $R^1$ is selected from the group of 1 to 20 carbon atom monovalent alkyl, aryl, or alkaryl hydrocarbon radicals and terminally unsaturated alkenyl groups of from 2 to 10 carbon atoms; $R^2$, $R^3$ are each independently any monovalent hydrocarbon radical: alkyl, aryl, or alkaryl of from 1 to 20 carbon atoms or $R^1$ and each $R^4$ and $R^5$ are any monovalent hydrocarbon radical: alkyl, aryl, alkenyl, or alkaryl of from 1 to 20 carbon atoms, preferably methyl ($CH_3$), and $R^6$ is a fluorine substituted 3 to 20 carbon atom monovalent hydrocarbon radical and $R^7$ is any monovalent hydrocarbon radical: alkyl, aryl, or alkaryl of from 1 to 20 carbon atoms or $R^6$.

When the subscript a is zero a fluorine containing homopolymer results in contrast to the copolymers formed when the subscript a is positive. It is to be noted that stoichiometrtic subscripts will be either zero or a positive integer for pure compounds and for mixtures the subscripts will an average value depending on the molecular (or polymeric) species comprising the mixture.

The fluoro trimer has the following formula:

$$(R^6R^7SiO)_3$$

where $R^6$ is a fluorine substituted 3 to 20 carbon atom monovalent hydrocarbon radical having no fluorine substitution on the alpha or beta carbon atoms of the radical, and $R^7$ is any monovalent hydrocarbon radical: alkyl, aryl, or alkaryl of from 1 to 20 carbon atoms or $R^6$.

The alkenyl dialkyl silanol has the following formula:

$$R^1R^2R^3SiOH$$

where the R groups are as previously defined.

The oxygenated promoter is preferably selected from the group consisting of acetone, methylethyl ketone, tetrahydrofuran, dioxane, dimethoxyethane, di(ethyleneglycol)dimethylether, tetra(ethyleneglycol)dimethylether, dimethylsulfoxide, tetramethylurea, dibutylether, methyisopropylketone, and the like.

The process of the present invention provides for the for the preparation of compounds having the formula:

$$MD_aD^F_bM'$$

with $M=R^1R^2R^3SiO_{1/2}$;
$M'=(OH)R^6R^7SiO_{1/2}$ or $(OH)R^4R^5SiO_{1/2}$;
$D=R^4R^5SiO_{2/2}$; and
$D^F=R^6R^7SiO_{2/2}$;

where the subscript a is zero or positive, the subscript b is positive and the subscripts a and b satisfy the following relationship: $b>0.4(a+b)$ and $R^1$ is selected from the group of 1 to 20 carbon atom monovalent alkyl, aryl, or alkaryl hydrocarbon radicals and terminally unsaturated alkenyl groups of from 2 to 10 carbon atoms; $R^2$, $R^3$ are each independently any monovalent hydrocarbon radical: alkyl, aryl, or alkaryl of from 1 to 20 carbon atoms or $R^1$ and each $R^4$ and $R^5$ are any monovalent hydrocarbon radical: alkyl, aryl, alkenyl, or alkaryl of from 1 to 20 carbon atoms, preferably methyl ($CH_3$), and $R^6$ is a fluorine substituted 3 to 20 carbon atom monovalent hydrocarbon radical having no fluorine substitution on the alpha or beta carbon atoms of the radical and $R^7$ is any monovalent hydrocarbon radical: alkyl, aryl, or alkaryl of from 1 to 20 carbon atoms or $R^6$ from the reaction product of $(R^6R^7SiO)_3$, with $(R^4R^5SiO)_3$, and $R^1R^2R^3SiOH$ and an oxygenated promoter.

Preferably $R^1$ is methyl or vinyl, $R^2$, $R^3$ $R^4$ and $R^5$, and $R^6$ are methyl, and $R^7$ is tri-fluoropropyl, $CH_2CH_2CF_3$.

Alternatively, the product $MD_aD^F_bM'$, as defined above, can be self condensed to a product $MD_{na}D^F_{mb}M$, where n and m are independently non-integral, non-zero and greater than one having a typical value of approximately two. This condensation produces a polymeric product similar to that obtained by treating $MDaD^FbM'$ with a disilazane or sily-lamine, except that the polymeric chain is lengthened. Such a condensation may be accomplished by placing the reaction vessel under a vacuum when the reaction is nearly complete to form $MD_{na}D^F_{mb}M$ using the sodium hydroxide that was the polymerization catalyst and heating to a condensation temperature of 100-135° C. The vacuum will remove the promoter, such as acetone, and this is desirable so that at these temperatures the promoter does not promote the depolymerization of the product cyclics to cyclics. The condensation can also be accomplished using phosphonitrillic chlorides as a catalyst. Some of the phosphonitrillic chloride is first neutralized by the sodium hydroxide polymerization catalyst, and the preferred range of phosphonitrillic chloride for condensation is 50-300 ppm.

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product or final material.

EXPERIMENTAL

Example 1

1100 gram of tris(3,3,3-trifluoropropyl)trimethylcyclotrisiloxane was place in a 2 liter flask, heated to 80° C. and sparged with dry nitrogen for 30 minutes to dry the material and was cooled to room temperature. 150 grams of the pre-dried material was placed in each of 8 eight ounce jars. The jars and contents were heated to 45° C. To each jar was added an amount of 72.5% assay dimethylvinylsilanol, containing 1.6% water, the remaining material being divinyltetramethyldisiloxane, which is unreactive in the described process. To each jar was added, an indicated amount of acetone (<0.5% water), and an indicated amount of the 72.5% dimethylvinylsilanol. The water in the 72.5% dimethylvinylsilanol will also act as a chainstopper to produce silanol end groups and must be counted as part of the total chainstopper. Therefore, the amount of 72.5% dimethylvinylsilanol added to each jar was multipled by 0.016% to determine the water content, and the water content was multiplied by 5.67 which is the ratio of molecular weight of dimethylvinylsilanol to water. When added together these 2 numbers are the equivalent dimethylvinylsilanol in each jar. 0.1 gram of a sodium fluorosilananolate, containing 4.5% sodium hydroxide was added to each jar, and the jars were vigorously stirred to allow complete mixing. This is equivalent to 30 ppm NaOH. The polymerizations were each terminated after 2 hours by neutralizing the NaOH with 0.11 grams of a silylphosphate equivalent to 10% phosphoric acid. Each polymer was measured on a Carri-Med viscometer, which reports viscosity in centipoises.

The results are:

A=wt. % acetone

B=grams of 72.5% dimethylvinylsilanol

C=ppm of dimethylvinylsilanol based on assay and weight of added 72.5% dimethylvinylsilanol D=dimethylvinylsilanol equivalence based on the water content of the amount of added 72.5% dimethylvinylsilanol (amount of water times 5.67)

E=total equivalent dimethylvinylsilanol

| Sample # | A | B | C | D | E | viscosity in cps |
|---|---|---|---|---|---|---|
| 1 | 0.1 | 0.363 | 1750 | 220 | 1970 | 159500 |
| 2 | 0.1 | 0.414 | 2000 | 253 | 2253 | 124000 |
| 3 | 0.1 | 0.510 | 2500 | 262 | 2762 | 68800 |
| 4 | 0.1 | 0.569 | 2750 | 339 | 3089 | 53100 |
| 5(repeat of 3) | 0.1 | 0.510 | 2500 | 262 | 2762 | 70000 |

A plot of total dimethylvinylsilanol chainstopper equivalence vs viscosity is a perfectly straight line on a semilog plot with an r squared value of 0.98. Over this viscosity range this shows exact reproducibility and that the low temperature of polymerization, allowed by only 0.1% acetone minimized or prevented of condensation, a situation which would likely give less reproducibility of viscosity.

Example 2

Two 1000 ml flasks with an agitator and heating mantle were set up side by side. 510 g of tris(3,3,3-trifluoropropyl) trimethylcyclotrisiloxane were added to each flask. The flask contents were heated to 80° C. with a dry nitrogen purge to dry the product and drying was complete when 10 grams of the material was collected in a cold trap. The content of both flasks was cooled to 45° C. 0.21 grams of water was added to each flask. Expressed as equivalent dimethylvinylsilanol (see Example 1), this is equivalent to 2380 ppm).To flask A was added 10 grams of acetone containing 0.2% water. This is equivalent to 226 ppm of dimethylvinylsilanol. This amount of acetone was the amount needed to completely solubilize the water in the trisiloxane. No acetone was added to flask B. 0.31 g of a 4.5% solution of sodium hydroxide, as a sodium fluorosilanolate, was added to each flask. After 30 minutes, a sample of product was taken from each flask and the sodium hydroxide was deactivated with a drop of acetic acid. The weight loss (135° C., 45 minutes, 15 mm) of each sample was measured. The product from flask A had a weight loss of <5%, indicating that it was completely polymerized, and the weight loss of the sample from flask B was 100%, indicating to reaction had taken place. The normal polymerization temperature for fluorosilicone trimer with NaOH (no promoter) is 120-135° C., so the contents of a sealed Flask B were heated to 130° C. An increase in viscosity was noted after 10 minutes, and the batch was polymerized in 2 hours. A sample was taken from the batch, deactivated with acetic acid and the weight loss measured as with Flask A. The weight loss was 3%. When the polymerization were finished in each flask, 0.36 g of silyl phosphate at 10% equivalent phosphoric acid was added. The viscosities of both batches were measured on a Carri-Med viscometer

| Sample | ppm total equivalent dimethylvinylsilanol | Viscosity, cps |
| --- | --- | --- |
| From flask A | 2606 | 89600 |
| From flask B | 2380 | 1060000 |

The product from the Flask A, containing acetone as a promoter and allowing polymerization at 45° C., has a viscosity almost exactly on the line from the chainstopper/viscosity curve in Example 1, demonstrating that, which these type of reaction parameters, water can be effectively used as a reproducible chainstopper. These conditions give a disilanol stopped polymer. Such polymers may now be treated with divinyltetramethyldisilazane or hexamethyldisilazane to produce the corresponding vinyl and trimethylsilyl terminated polymers. The resulting viscosity from the product from Flask B shows that at normal polymerization temperatures for fluorosilicone cyclic trimer, 120-135° C. and/or in the absence of a promoter, water either does not polymerize with the trimer, or such conditions cause condensation during the polymerization process or both.

Example 3

Fluorosilicone cyclic trimer will polymerize in a non-equilibration manner to give polymer yield of 98%+ of polymer using NaOH at 120-135° C.

This experiment shows that using a high boiling promoter allows the polymerization of 1,3,5-tris(3,3,3-trifluoropropyl) 1,3,5-trimethylcyclotrisiloxane to >95% polymer at room temperature and low levels of NaOH catalyst.

Example 4

0.3 grams of FSE7340, a silicone rubber compound containing 26 wt % filler was completely dissolved in 300 grams of fluorosilicone trimer. The sample was heated to 100° C. and sparged with dry nitrogen to remove water. Approximately 5 grams of trimer was lost, but the loss was ignored. The sample was cooled to room temperature and divided equally into 2 bottles. To bottle A was added 0.045 grams (300 ppm) of tetra(ethyleneglycol) dimethylether as a promoter. This compound boils at 275° C. To bottles A and B were added 0.04 g of a 4.5% NaOH as a sodium fluorosilanolate. This is equivalent to 12 ppm NaOH, a typical catalyst level. Bottle A was left at room temperature and were samples taken over time and deactivated with a very small drop of acetic acid to deactivate the NaOH. The weight loss of these samples were taken (135° C., 45 minutes, 15 mm). The weight loss was 1% after 90 minutes demonstrating complete polymerization in the presence of 260 ppm silica from the FSE7340. Bottle B was placed in a 135° C. and left there for 1.5 hours. The bottle contents was a very low viscosity showing little of no polymerization. At this point a 0.06 g increment of a 4.5% sodium hydroxide solution as a fluorosilanolate, equivalent to 18 ppm NaOH was added to Bottle B and the bottle returned to the 135° C. oven for 2 more hours. No apparent polymerization had occurred. A sample was taken from the bottle, deactivated with acetic acid, and the weight loss measure as above. The weight loss was 98.5%. This demonstrates that the use of a promoter could allow the polymerization of the fluorosilicone cyclic trimer in the presence of a small about of silicone rubber compound, thus allowing the possibility that, in one mixer, polymerization of the trimer followed by conversion of the polymer to a silicone rubber compound with a silica filler could be accomplished in one mixer without the separate isolation of the polymer. This eliminates the cost of removing polymer of a mixer and charging it to a second mixer.

Example 5

600 grams of 1,3,5-(3,3,3-trifluoropropyl)-1,3,5-trimethylcyclotrisiloxane was placed in a 1 L. flask with an agitator, a nitrogen bubbler, and a gas takeoff line which was connected to a cold trap. The cyclic siloxane was heated to 80° C. and purged with dry nitrogen for 40 minutes to dry the batch. The temperature was reduced to 50° C., at which point 3 grams of acetone and 2.5 grams of 81% pure dimethylvinylsilanol containing 2.7% water was added to the batch and mixed in. This was followed by the addition of 0.40 grams of a sodium fluorosilanolate with a 4.5% sodium hydroxide equivalent assay (30 ppm NaOH). An exothermic poloymerization of the cyclic trimer occurred with a few minutes with the temperature rising to about 80° C. The flask contained a thermo controller set at 50° C., and the batch was cooled to this temperature after 1.5 hours. A sample was taken 2 hours after catalyst addition and the sample was neutralized with acetic acid. The weight loss of the sample at conditions of 45 minutes, 134° C., at 15 mm, was 2.2% indicating a completed polymerization. The polymer at this point contained dimethylvinylsilyl and silanol groups end groups. The viscosity was 31300 cps measured on a Carri-Med viscometer. Condensation of the silanols using the sodium hydroxide polymerization catalyst as the only condensation catalyst was performed next . Condensation removes silanol chainstopper and the chainstopper reduction will significantly increase the viscosity and produces a primarily dimethylvinylsilyl terminated polymer. Condensation was accomplished by applying 20 mm of vacuum to the batch and the batch temperature was raised to 100° C. This quickly removed the acetone. At 100° C., the vacuum was improved to 1 mm and the conditions of 100° C. and 1 mm were maintained for 3 hours. A sample was taken and the sodium hydroxide was neutralized with acetic acid. The weight loss was 2.5% and the viscosity was 91700 cps, indicating significant removal of the silanols and yielding a primarily dimethylvinylsilyl terminated polymer.

Example 6

600 grams of 1,3,5-(3,3,3-trifluoropropyl)-1,3,5-trimethylcyclotrisiloxane was placed in a 1 L. flask with an agitator, a nitrogen bubbler, and a gas takeoff line which was connected to a cold trap. The cyclic siloxane was heated to 80° C. and purged with dry nitrogen for 40 minutes to dry the batch. The temperature was reduced to 50° C., at which point 3 grams of acetone and 2.9 grams of 81% pure dimethylvinylsilanol containing 2.7% water was added to the batch and mixed in. This was followed by the addition of 0.40 grams of a sodium fluorosilanolate with a 4.5% sodium hydroxide equivalent assay (30 ppm NaOH). An exothermic polymerization of the cyclic trimer occurred with a few minutes with the temperature rising to about 73° C. The flask contained a thermo controller set at 50° C., and the batch cooled to this temperature after 1.2 hours. A sample was taken 2 hours after catalyst addition and the sample was neutralized with acetic acid. The weight loss of the sample at 45 minutes, 134° C., 15 mm, was 2.9% indicating a completed polymerization. The polymer at this point contained dimethylvinylsilyl and silanol endgroups. The viscosity was 39160 cps measured on a Carri-Med viscometer. Condensation of the silanols was accomplished using linear phosphonitrillic chloride, a well known silanol condensation catalyst. Condensation removes silanol chainstopper and the chainstopper reduction will significantly increase the viscosity and produces a primarily dimethylvinylsilyl terminated polymer. 4.5 grams of a 2.2% solution of phosphonitrillic chloride was added to the batch. This is 165 ppm LPNC., which is 84% chloride. Therefore, 36 ppm of the LPNC was consumed to neutralize the original 30 ppm NaOH polymerization catalyst. Condensation was accomplished by applying 20 mm of vacuum to the batch and the batch temperature was raised to 100° C. This quickly removed the acetone. At 100° C., the vacuum was improved to 1 mm and the conditions of 100° C. and 1 mm were maintained for 3 hours. LPNC can be decomposed at high temperature, therefore, the batch was thereafter heated to 200° C. while still under 1 mm of vacuum. When 200° C. was reached, the batch was cooled to room temperature The weight loss was 0.4% showing no depolymerization and the removal of residual cyclic siloxanes at ending batch temperature and vacuum. The product viscosity was 176400 cps, indicating significant removal of the silanols and yielding a primarily dimethylvinylsilyl terminated polymer.

The foregoing examples are merely illustrative of the invention, serving to illustrate only some of the features of the present invention. The appended claims are intended to aim the invention as broadly as it has been conceived and the examples herein presented are illustrative of selected embodiments from a manifold of all possible embodiments. Accordingly it is Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied, those ranges are inclusive of all sub-ranges there between. Such ranges may be viewed as a Markush group or groups consisting of differing pairwise numerical limitations which group or groups is or are fully defined by its lower and upper bounds, increasing in a regular fashion numerically from lower bounds to upper bounds. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims. All U.S. patents (and patent applications) referenced herein are herewith and hereby specifically incorporated by reference in their entirety as though set forth in full.

Having described the invention that which is claimed is:

1. A process for making a fluorositicone having the formula:

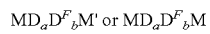

where
M=$R^1R^2R^3SiO_{1/2}$;
M'=$(OH)R^6R^7SiO_{1/2}$ or $(OH)R^4R^5SiO_{1/2}$;
D=$R^4R^5SiO_{2/2}$; and
$D^F$=$R^6R^7SiO_{2/2}$;
where both the subscript and stoichiometric coefficient a are zero or positive, the subscript and stoichiometric coefficient b is positive and the subscripts a and b satisfy the following relationship: b>0.4(a+b) and $R^1$ is selected from the group of 1 to 20 carbon atom monovalent alkyl, aryl, or alkaryl hydrocarbon radicals and terminally unsaturated alkenyl groups of from 2 to 10 carbon atoms; $R^2$, $R^3$ are each independently any monovalent hydrocarbon radical: alkyl, aryl, or alkaryl of from 1 to 20 carbon atoms or $R^1$ and each $R^4$ and $R^5$ are any monovalent hydrocarbon radical: alkyl, aryl, alkenyl, or alkaryl of from 1 to 20 carbon atoms, and $R^6$ is a fluorine substituted 3 to 20 carbon atom monovalent hydrocarbon radical having no fluorine substitution on the alpha or beta carbon atoms of the radical and $R^7$ is any monovalent hydrocarbon radical: alkyl, aryl, or alkaryl of from 1 to 20 carbon atoms or $R^6$ by reacting
1) b moles of $(R^6R^7SiO)_3$
with
2) a moles of $(R^4R^5SiO)_3$,
3) a silanol having the formula $R^1R^2R^3SiOH$;
4) an oxygenated promoter and
5) a basic catalyst.

2. The process of claim 1 wherein $R^1$ is methyl.
3. The process of claim 1 where $R^1$ is vinyl.
4. The process of claim 1 where $R^6$ is trifluoropropyl.
5. The process of claim 1 where the oxygenated promoter is selected from the group consisting of acetone, methylethyl ketone, tetrahydrofuran, dioxane, dimethoxyethane, di(ethyleneglycol)dimethylether, tetra(ethyleneglycol)dimethylether, dimethylsulfoxide, tetramethylurea, dibutylether, methyisopropylketone and mixtures thereof.
6. The process of claim 5 where $R^6$ is trifluoropropyl.
7. The process of claim 6 wherein $R^1$ is methyl.
8. The process of claim 6 wherein $R^1$ is vinyl.
9. A process for making a fluorosilicone rubber comprising:
a) the process of claim 1; and
b) the addition of a filler
wherein said process is conducted in a single vessel.
10. The process of claim 9 wherein the filler is fumed silica.
11. The process of claim 1 further comprising the condensation of $MD_aD^F_bM'$ with itself using a condensation catalyst.

12. The process of claim 11 wherein the condensation catalyst is sodium hydroxide.

13. The process of claim 12 wherein the condensation catalyst is a phosphonitrilic halide.

14. A process for making a fluorosilicone having the formula:

$$MD_aD^F_bM' \text{ or } MD_aD^F_bM$$

where
- $M = R^1R^2R^3SiO_{1/2}$;
- $M' = (OH)R^6R^7SiO_{1/2}$ or $(OH)R^4R^5SiO_{1/2}$;
- $D = R^4R^5SiO_{2/2}$; and
- $D^F = R^6R^7SiO_{2/2}$;

where both the subscript and stoichiometric coefficient a are zero or positive, the subscript and stoichiometric coefficient b is positive and the subscripts a and b satisfy the following relationship: $b > 0.4(a+b)$ and $R^1$ is selected from the group of 1 to 20 carbon atom monovalent alkyl, aryl, or alkaryl hydrocarbon radicals and terminally unsaturated alkenyl groups of from 2 to 10 carbon atoms; $R^2$, $R^3$ are each independently any monovalent hydrocarbon radical: alkyl, aryl, or alkaryl of from 1 to 20 carbon atoms or $R^1$ and each $R^4$ and $R^5$ are any monovalent hydrocarbon radical: alkyl, aryl, alkenyl, or alkaryl of from 1 to 20 carbon atoms, and $R^6$ is a fluorine substituted 3 to 20 carbon atom monovalent hydrocarbon radical having no fluorine substitution on the alpha or beta carbon atoms of the radical and $R^7$ is any monovalent hydrocarbon radical: alkyl, aryl, or alkaryl of from 1 to 20 carbon atoms or $R^6$ by reacting at a temperature ranging from about 20° C. to about 90° C.:

1) b moles of $(R^6R^7SiO)_3$ with 2) a moles of $(R^4R^5SiO)_3$,
3) a silanol having the formula $R^1R^2R^3SiOH$;
4) an oxygenated promoter and
5) a basic catalyst;

wherein said fluorosilicone has a viscosity ranging from about 300 centipoise to about 200,000 centipoise at 25° C.

15. A process for making a fluorosilicone having the formula:

$$MD_aD^F_bM' \text{ or } MD_aD^F_bM$$

where
- $M = R^1R^2R^3SiO_{1/2}$;
- $M' = (OH)R^6R^7SiO_{1/2}$ or $(OH)R^4R^5SiO_{1/2}$;
- $D = R^4R^5SiO_{2/2}$; and
- $D^F = R^6R^7SiO_{2/2}$;

where both the subscript and stoichiometric coefficient a are zero or positive, the subscript and stoichiometric coefficient b is positive and the subscripts a and b satisfy the following relationship: $b > 0.4(a+b)$ and $R^1$ is selected from the group of 1 to 20 carbon atom monovalent alkyl, aryl, or alkaryl hydrocarbon radicals and terminally unsaturated alkenyl groups of from 2 to 10 carbon atoms; $R^2$, $R^3$ are each independently any monovalent hydrocarbon radical: alkyl, aryl, or alkaryl of from 1 to 20 carbon atoms or $R^1$ and each $R^4$ and $R^5$ are any monovalent hydrocarbon radical: alkyl, aryl, alkenyl, or alkaryl of from 1 to 20 carbon atoms, and $R^6$ is a fluorine substituted 3 to 20 carbon atom monovalent hydrocarbon radical having no fluorine substitution on the alpha or beta carbon atoms of the radical and $R^7$ is any monovalent hydrocarbon radical: alkyl, aryl, or alkaryl of from 1 to 20 carbon atoms or $R^6$ by reacting 1) b moles of $(R^6R^7SiO)_3$ with 2) a moles of $(R^4R^5SiO)_3$,
3) a silanol having the formula $R^1R^2R^3SiOH$;
4) an oxygenated promoter and
5) a basic catalyst to produce a fluorosilicone; and further reacting the fluorosilicone with a silazane selected from the group consisting of 1,1,3,3-tetramethyl-1,3-diphenyldisilazane, 1,1,3,3-tetramethyldisilazene, and hexamethyldisilazane.

* * * * *